United States Patent [19]
Chichester et al.

[11] 3,900,075
[45] Aug. 19, 1975

[54] HYDROSTATIC PROPULSION SYSTEM

[75] Inventors: Willard L. Chichester; Donald A. Holtkamp, both of Battle Creek, Mich.

[73] Assignee: Clark Equipment Company, Buchanan, Mich.

[22] Filed: Apr. 15, 1974

[21] Appl. No.: 460,832

[52] U.S. Cl. ................... 180/6.3; 60/486; 180/66 R
[51] Int. Cl. ..................... B60k 17/10; B62d 11/04
[58] Field of Search ................ 180/6.3, 44 F, 66 R; 60/484, 486

[56] References Cited
UNITED STATES PATENTS

| | | | |
|---|---|---|---|
| 3,092,970 | 6/1963 | Sampietro | 180/66 R |
| 3,422,917 | 1/1969 | Guinot | 180/66 R |
| 3,595,334 | 7/1971 | Issac | 180/66 R |

*Primary Examiner*—David Schonberg
*Assistant Examiner*—J. A. Pekar
*Attorney, Agent, or Firm*—John C. Wiessler

[57] ABSTRACT

A hydrostatic transmission system for driving vehicle traction motors and wheels in both two and four wheel-drive in which may be selectively combined both closed and open loop circuits. The system includes engine speed control, circuit drive and control means which include a reversible variable displacement pump delivering pressure fluid selectively to drive motors at two or four traction wheels, and a fixed displacement pump combining its output with that of the variable displacement pump to effect a "high gear" wheel speed ratio in two-wheel drive as compared with "low gear" wheel speed ratio in four-wheel drive. The control means includes flow divider-combiner and valve means to proportion the total pump flow in four-wheel drive between front and rear pairs of wheels and also between the nondirigible wheels of one of said pairs of wheels for differentiating the speed of the latter wheels during vehicle turning, to enable a smooth transition beteeen two and four-wheel drive and vice versa under any driving condition, and to compatibly combine open and closed loop circuits in the same drive system.

29 Claims, 5 Drawing Figures

HYDROSTATIC PROPULSION SYSTEM

BACKGROUND OF THE INVENTION

Hydrostatic transmission systems in vehicle applications affording two and four-wheel drive at the operator selection have heretofore generally been either of the open loop type wherein the fluid flow system originates and terminates at a reservoir, or in which a pair of independent variable displacement pumps operate in a recirculating or closed loop system to supply pressure fluid to opposite pairs of tendem wheel motors on opposite sides of the vehicle, or in which a single non-reversible variable displacement pump supplies pressure fluid to all wheel motors through reversing valves. In some instances, a pair of pumps is non-reversible and supplies fluid to the motor through reversing valves.

A number of prior systems are shown in patent references cited in our copending application Ser. No. 220,281 filed Jan. 24, 1972, now abandoned, of which our application Ser. No. 406,768 filed Oct. 15, 1973, now Pat. No. 3,841,423 is a continuation. Generally, the primary hydrostatic closed loop drive circuit of the two and four-wheel drive system of our copending application is a part of the present invention.

SUMMARY OF THE INVENTION

The present invention concerns a traction drive hydrostatic transmission system which uniquely combines open and closed loop drive circuits. The open loop circuit is combined with a closed loop circuit functionally of the type disclosed in our above copending application, which includes primary flow divider-combiner and valve means controllable to selectively combine or divide the closed loop circuit flow for two or more wheel drive in both forward and reverse, and a second flow divider-combiner means in circuit with the primary one responsive to steering angle for differentiating the nondirigible wheel speeds during turning of the vehicle. The open loop circuit is selectively combined with the closed loop circuit in two-wheel drive to increase the wheel speed ratio for road speeds.

It is therefore a primary object of our invention to provide a hydrostatic transmission system which provides closed and open loop drive circuits selectively combinable for two or more wheel drive.

Another important object of the invention is to reduce substantially the over-all cost of such hydrostatic systems by selectively combining closed and open loop drive circuits in the same hydrostatic system.

Further and more particular objects and features of the invention will become apparent to those skilled in the art from the following description and drawing forming a part hereof.

DESCRIPTION OF THE PREFERRED EMBODIMENTS

Figure 1:
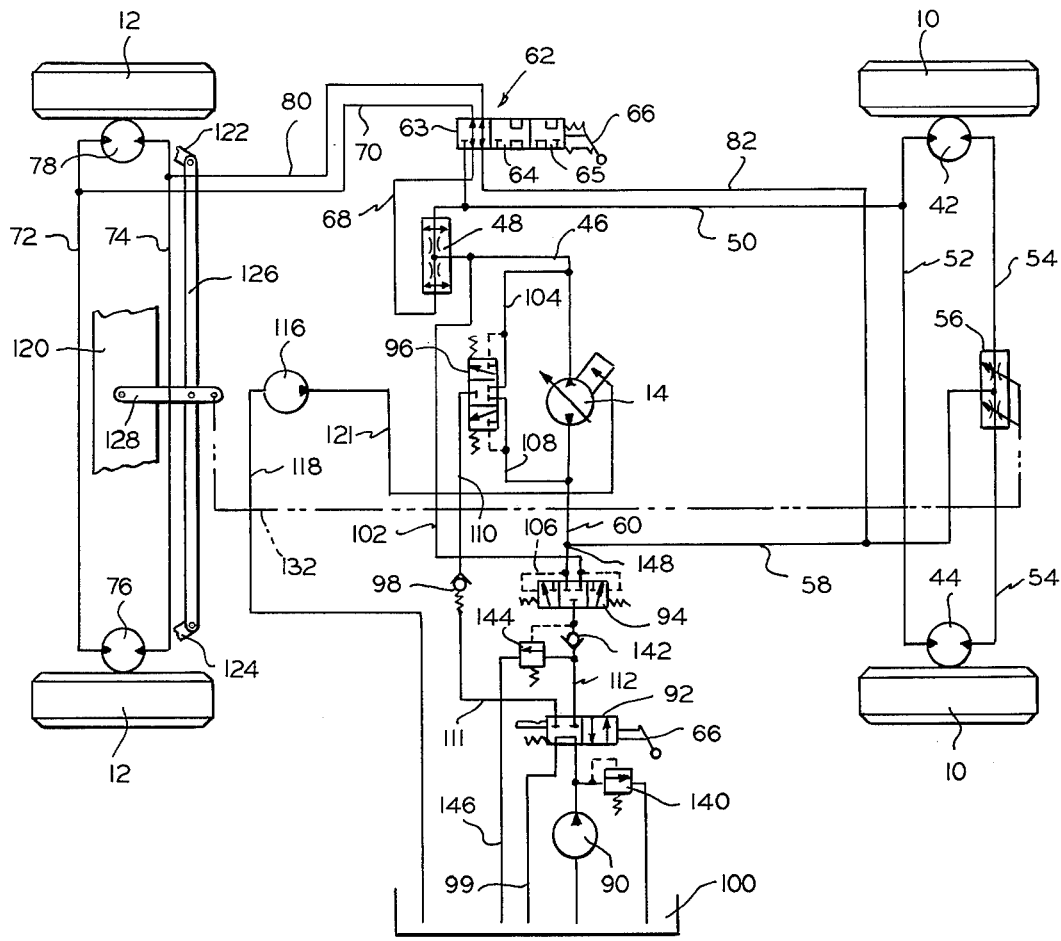
FIG. 1 is a schematic view of one embodiment of our hydrostatic transmission system in a vehicle.
Figure 2:
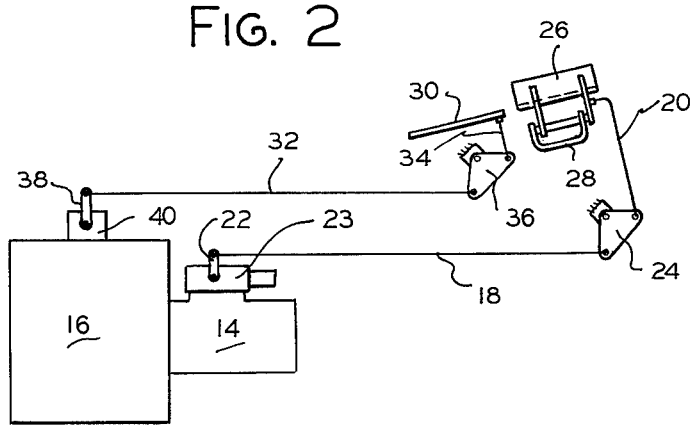
FIG. 2 shows schematically the vehicle engine, variable displacement pump, and operator controls therefor.
Figure 3:
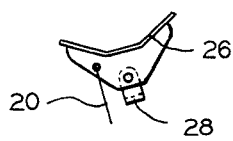
FIG. 3 is a front view of one of the operator's pump controls as shown in FIG. 2.

Referring now in detail to FIGS. 1-3, a vehicle is represented by front and rear pairs of drive wheels 10 and 12 in which is housed our hydrostatic transmission system which includes an operator controlled reversible variable displacement pump 14 driven by an engine 16 coupled thereto (FIG. 2), the camming or swash plate of the pump being directly controllable by push-pull cables and levers 18, 20, 22 and 24 actuatable by a reversible operator's pedal control 26 pivotally mounted from a bracket 28 and having a configuration such as shown for pushing cables 18 and 20 to adjust pump 14 for forward vehicle drive, and pulling said cables to adjust the pump for reverse drive. FIG. 2 represents the control conditioned in a neutral or zero stroke position of the pump. An accelerator pedal 30 may be similarly connected by push-pull cables and levers 32, 34, 36 and 38 to control the engine via a carburetor 40.

Pump 14 is connected hydraulically in forward drive to a forward pair of fixed displacement front wheel motors 42 and 44 by a pump discharge conduit 46, the one side of a main flow divider-combiner unit 48, a conduit 50 and conduits 52 and 54 which connect wheel motors 42 and 44 in parallel loop circuit, and a second adjustable flow divider-combiner unit 56 in conduit 54, unit 56 being connected to the inlet side of the pump in the closed loop circuit by way of conduits 58 and 60. In reverse drive, the opposite direction of flow through motors 42 and 44 proceeds from pump 14 through conduit 60, 58, and the divider unit 56 to conduit 50 and through the said one side of unit 48 to the pump inlet through conduit 46.

The rear wheel motors 76 and 78 are driven in four-wheel drive with an operator's control valve 62 having operative sections 63, 64 and 65 located in the position shown. Valve 62 is operated by a manual control lever 66 so that in forward four-wheel drive a portion of the pressure fluid discharge of pump 14 is directed through the other side of divider unit 48 and conduits 68 and 70 to a paralleling circuit 72 and 74 which connects wheel motors 76 and 78, the discharge flowing back to the pump inlet by way of conduits 80, 82, 58 and 60. In reverse drive, the flow to motors 76 and 78 is the reverse of the foregoing, returning to unit 48 which now functions as a flow combiner by way of conduits 70 and 68, the total flow from the four-wheel motors being recombined in the pump inlet conduit 46.

Whenever the vehicle is operated in four-wheel drive mode, an open loop circuit which includes a fixed displacement pump 90, an open-center valve 92 coordinated with the operation of valve 62 by manual control 66 in a manner to be described, shuttle valves 94 and 96, a return control check valve 98, and associated circuit elements, is operative to maintain separate the open and closed loop circuits in a manner to be described, the engine driven pump 90 circulating fluid through open-center valve 92 and a return conduit 99 into a reservoir 100. The open loop circuit functions to combine with the closed loop circuit in two-wheel drive only, to drive wheels 10 at a rotational speed four times the speed of the wheels 10 and 12 in four-wheel drive in the system as shown in which pumps 14 and 90 are assumed to be equal in capacity, all in a manner which will be described below. It will be noted that spring balanced three position shuttle valve 94 and 96 are both adapted to be actuated by pressure fluid applied to either end of the respective valves in one direction or the other from the central shut-off positions illustrated. That is, the opposite ends of said valves are responsive to the discharge pressure in either of conduits 46 or 60, depending upon forward or reverse drive mode, valves 94 and 96 being connected at the right-hand ends by lines 102 and 104 to conduit 46 and at the left-hand ends to conduit 60 by lines 106 and 108, respectively. A conduit 110 connects the one port in valve 96 to the dead port in valve 92, as shown, through control check valve 98 so that regardless of the direction of rotation of pump 14 to actuate valve 96 in either one direction or the other, there is no flow through valves 96 and 92 because of the open-center position of valve 92 in four-wheel drive. Likewise, whereas valve 94 is pressure actuated in one direction or the other, depending upon the rotational direction of pump 14, there is no flow therethrough to either conduit 102 or conduit 60 from a line 112 because the latter line is connected to a dead port in valve 92 when it is located in the open center position shown.

Reverting back now to the four-wheel drive mode in which only pump 14 is effectively in circuit, the operative circuit is similar functionally to the four-wheel drive mode of our above copending application. Likewise, the circuit at pump 14 operates similarly as previously in both a transition mode from four-wheel drive to two-wheel drive in which valve 62 is actuated to locate section 64 thereof in circuit, and in two-wheel drive in which valve 62 is actuated to locate section 65 thereof in circuit. That is, actuation by the operator of control 66 to move valve section 64 in circuit interrupts communication of wheel motors 76 and 78 with pump 14 and interconnects conduits 68 and 82, as shown by the valve symbol. In this condition, one-half of the discharge of pump 14 is directed through divider unit 48 to drive wheels 10 as described previously, whereas the remainder of the pump discharge is directed through the other side of divider unit 48 to recirculate through valve section 64 to the inlet of pump 14 by way of conduits 68, 82, 58 and 60 while the circuit connecting the rear wheel motors circulates in a parallel closed loop.

In this respect it will be found desirable in practice to provide a valve controlled cooling circuit connecting the drive circuit of the rear wheels to the reservoir, and a charging and anti-cavitation check valve circuit connected across line 72 and 74 and to a charging pump and fluid makeup circuit which includes a charging pump 116 connected to the reservoir by a conduit 118 and to pump 14 by line 121. Anti-cavitation check valves should also be provided in parallel with flow dividers 48 and 56 and connected as well to the charging pump conduit 121, all as described in our above-identified copending application. The recirculating fluid cooling circuit, and above check valve circuits, as well as a fluid motor leakage circuit which interconnects the various wheel motors to the reservoir to collect and return any leakage fluid occurring at any motor, are disclosed in our copending application, and have not been disclosed herein inasmuch as such components do not comprise a part of this invention.

A steer axle is partially represented at numeral 120 on which dirigible wheels 12 are adapted to be mounted. Steering arms 122 and 124 are connected to a tie rod 126 which is pivotally connected at its center to a lever arm 128 pivotally connected in turn from the steer axle to push-pull cable represented by broken line 132 which is connected to the adjustable flow divider-combiner unit 56 for proportionalizing the fluid flowing to or from drive motors 42 and 44 as a function of the steer angle of wheels 12, all as described in more detail in our copending application.

In forward operation, the system as shown in FIG. 1 is in four-wheel drive, as above explained, wherein with pedal control 26 in forward drive and pedal 30 control a selected engine speed under existing load conditions, the total discharge of pump 14 entering unit 48 which functions as a flow divider to direct one-half of the flow to wheels 10 and one-half of the flow to wheels 12 in a vehicle in which the wheels are all of the same diameter. Proportional flow divider unit 56 functions in this instance as a flow combiner to proportionalize the fluid driving each of wheels 10 as a function of steering angle at wheels 12, if any, to differentiate the wheel speed as required to avoid scrubbing of the tires and to maintain full traction at each of wheels 10 regardless of variations in surface conditions, with all such traction fluid returning to the pump inlet as before described. Actuation of operator control 66 to shift into two-wheel drive causes the valve to pass through transition valve section 64, as before described, to operate wheels 10 only as traction wheels at the full pump discharge pressure and flow of both pumps 14 and 90.

The use of operational transition through valve section 64 and shifting from four to two-wheel drive while the vehicle is being driven at any selected speed has been found to be important in order to control and minimize shock pressure loading in the system and jerky operation of the vehicle as vehicle speed is maintained the same as in four-wheel drive, but with one-half of the system's fluid not being utilized in the traction circuit. Thus, the system is conditioned for subsequent two-wheel drive at full speed by the transition condition of two-wheel drive at one-half speed, as claimed in our copending application. Further manipulation of control lever 66 to shift valve section 65 into operative position and to open valve 92 to the traction circuit in forward drive causes a number of operational events to occur as follows: pump 90, which is also connected to the reservoir by a pump relief valve 140, directs its full discharge pressure flow through a check valve 142 and the right-hand section of valve 94 and conduit 102 to combine with the discharge of pump 14 in conduit 46, which combined flow is divided at flow divider 48, one-half being directed to conduit 52 of the front wheel traction circuit directly by way of conduit 50, and the other one-half flow being also directed to said traction circuit by way of conduit 68 and the loop through valve section 65 and conduit 50. Recombination of the total fluid in conduit 58 downstream of the traction circuit and flow combiner 56 again divides between inlet conduit 60 to pump 14 and conduits 108, 110, 111 and 99, and valves 96, 98 and 92, to reservoir 100. The flow to the reservoir comprises, in this example, one-half of the fluid flowing, or a flow equal to the discharge of pump 90 in a system, as shown, wherein the capacities of pumps 14 and 90 are equal. In this instance, the flow proceeds through the upper section of valve 96, said valve being so actuated by the pressure on conduit 104, and thence to the reservoir as described. A return of fluid volume equal to the discharge volume of pump 90 is controlled by check valve 98, whereas a circuit unloading valve 144 connects conduit 112 upstream of check valve 142 to the reservoir by way of a conduit 146. Valve 144 protects the system circuit from any excessive pressure which may occur under certain operating conditions.

When operating in two-wheel drive in reverse the above-described system flow directions are reversed in that pump 14 discharges to the front wheel traction circuit by way of conduits 60 and 58, and pump 90 by way of the left side of valve 94, now responsive to conduit 60 pressure, which combines with pump 14 discharge at conduit intersect 148 at conduit 58. The return flow from said traction circuit to pump 14 is by way of conduit 50, the one side of flow combiner 48 and conduit 46, and the remainder is directed to the reservoir by way of conduit 50, valve 65, conduit 68, the other side of fluid combiner 48, conduits 46 and 104, the lower section of valve 96, and thence as before to the reservoir.

Referring again to the manipulation of valves 62 and 92 for two-wheel drive, it will be noted that by virtue of passing through transient valve section 64 that further manipulation of control lever 66 has no effect on other system components associated with wheel motors 76 and 78. Shifting to valve section 65 is preferably done in a controlled manner over a period of time, say, from one to five seconds, depending upon other vehicle operating conditions such as load, terrain, and engine speed. At full engine speed, for example, it is desirable to shift the valve more slowly than at lower engine speeds, and during the shifting movement the system fluid flow being conducted through valve section 64 to the pump inlet is gradually reduced and is redirected to the front wheel traction circuit through valve section 65, while at the same time the discharge of pump 90 is gradually shifted from its open loop return to reservoir to the traction circuit by the gradual opening of valve 92, until the total discharge of both pumps is directed to wheel motors 42 and 44 while under full operator control of engine speed and swash plate angle of pump 14.

It should be noted that pedal control 26 operates pump 14 for forward drive when pivoted in one direction and in reverse drive when pivoted in an opposite direction on bracket 28. It is possible to operate the front wheel circuit from pump 90 alone if pump 14 is actuated to neutral in a non-pumping condition, and the engine speed is increased. In other words, any combination of the total combined discharge of the pumps 14 and 90 provides an operator control in addition to that provided by engine speed and pump 14 control alone.

It will be apparent to persons skilled in the art that many design variables are available within the scope of the invention, such as utilizing wheels of different diameters as between the front and rear pairs of wheels, which will, of course, change the division of flow between the front and rear wheel circuits at flow divider-combiner 48 in proportion to the difference of the wheel diameters. Also, it is apparent that any combination of wheels desired may be provided, depending upon vehicle type, such as a three-wheeled vehicle in which, for example, the single third wheel of any relative diameter is located at the rear of the vehicle in place of wheels 12 as a third dirigible wheel, or the circuit may be readily adapted to a five or six-wheel vehicle. Clearly, as well, the hydrostatic system is applicable to tracked vehicles wherein cog wheels, in place of wheels 10 and 12, drive the tracks. It will also be appreciated that automatic controls may be substituted for manual control at control lever 66, but this is not necessarily desirable because it would tend to reduce the scope of options available to a skilled operator.

Another important design variable lies in the relative sizing of pumps 14 and 90. As mentioned above, if the pumps are of the same capacity each provides one-half the total flow at rated capacity in which condition wheels 10 are driven in two-wheel drive at a 4:1 speed ratio to four-wheel drive. This ratio may, of course, be varied to suit requirements depending on the selection of pump 90. If, for example, pump 14 has double the capacity of pump 90 the said speed ratio would be 3:1, but if pump 90 has double the capacity of pump 14 the said speed ratio would be 6:1. Thus, maximum road speed capabilities may be varied to suit requirements while retaining full traction capability in four-wheel drive.

Full braking capability is inherent in our transmission system, rendering service brakes unnecessary. Normal deceleration of the vehicle is effected merely by releasing the accelerator pedal 30; an increased rate of deceleration may be obtained by releasing both pedals 30 and 26 while underway in either two or four-wheel drive. Positive braking of the vehicle may be effected by reversing pump 14 while maintaining engine speed, and a "panic" stop is accomplished by reversing the pump and increasing the engine speed. Furthermore, as the vehicle is operating in two-wheel drive additional braking force is available by quick shifting valve 62 into four-wheel drive position, which also redirects the discharge of pump 90 to the reservoir. On slick surfaces it may be particularly desirable to shift from two to four-wheel drive during emergency stops in order to achieve the additional benefits of four-wheel traction with engine braking. Of course, quick shifting of control valve 62 is always available to the operator from any one condition of operation to any other and may be accomplished without damage to the system, the effect being to by-pass the normally smooth operation available in transition by timing the movement of the valve as a function of engine speed.

The circuit may be also modified as in FIG. 6 of our copending application in respect of the use of a fully adjustable flow divider-combiner in the closed loop circuit of pump 14 in place of valve 62 and flow divider 48, and other circuit changes as therein described.

Primary advantages of the present improvement over known hydrostatic drive systems reside in the degree of flexibility available both in component selection and design and in application to a variety of uses of the system, as well as in the relatively low cost of major components thereof. The uniqueness of the concept of combining open and closed loop systems in such a traction circuit contributes in large degree to such flexibility. As to the cost factor, it is noted that for a given specified performance requirement in hydrostatic drive systems that the cost of a variable displacement pump combined with a fixed displacement pump and associated components which enable such a combination are substantially less than the cost of a comparable closed loop system alone. For example, the cost of a variable displacement pump in a closed loop system such as disclosed in our copending application may be double the cost or greater of the combined cost of variable and fixed displacement pumps together providing the same two-wheel drive capability.

Figure 4:
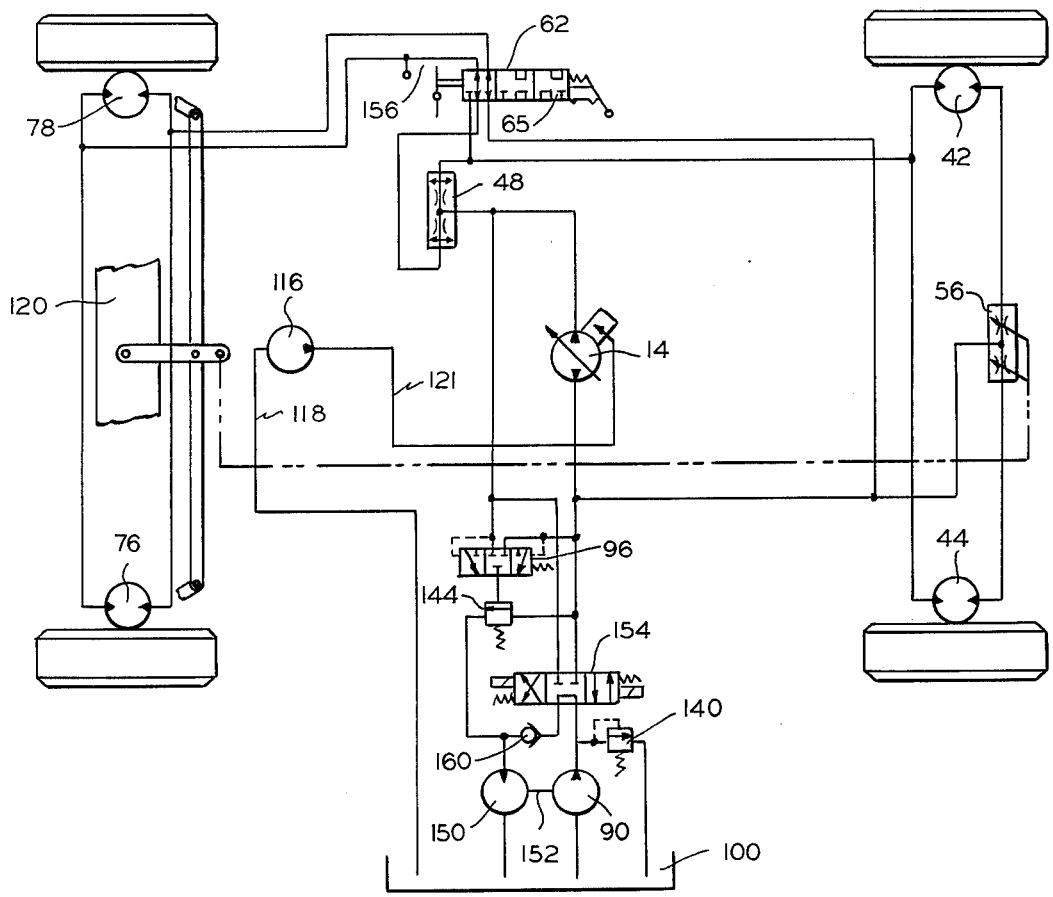
FIG. 4 is a schematic view of another embodiment of our hydrostatic transmission system.
Figure 5:
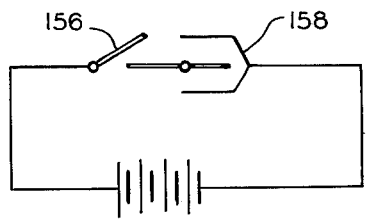
FIG. 5 shows a detailed circuit element of FIG. 4.

Referring now to FIGS. 4 and 5 a modified circuit is disclosed which in certain respects is preferred over the circuit above described in the provision of a gear motor 150 which is driven by a shaft 152 common to it and the pump 90. Other major components of FIG. 4 which may be the same as those of FIG. 1 are numbered the same as in FIG. 1.

Although some valving differences are shown in FIG. 4 as compared with FIG. 1 in respect of the operation of pump 90, the circuits operate substantially the same, gear motor 150 being an operational equivalent of check valve 98 in FIG. 1. However, motor 150 is more precise in controlling the volume of fluid returned to the reservoir to be equal to the volume discharged by pump 90, as will be apparent to persons skilled in the art.

The other circuit variations in FIG. 4 include a three-way valve 154 in place of valve 92, locating circuit unloading valve 144 in series with valve 96, and eliminating check valve 142. Also, a two-way solenoid actuator is provided at valve 154 instead of the manual linkage as in FIG. 1. This is illustrated schematically by the switch 156 which is closed when valve section 65 is moved into the circuit and a switch 158 is closed either by forward or reverse actuation of the pedal linkage. Valve 154 is fully actuated to forward or reverse mode in two-wheel drive in which switch 158 is actuated in one direction or the other by the forward or reverse pedal linkage and switch 156 is closed. Shuttle valve 96 senses the working system pressure as previously to actuate, in this circuit, circuit unloading valve 44 when the transmission circuit pressure exceeds the pressure rating of pump 14. That is, valve 96 is actuated in one direction or the other depending upon forward or reverse drive, the opposite ends of the valves being responsive to the pressure in the discharge pressure line of pump 14 which prevents excess pressure flow through valve 144 to gear motor 150 which returns to the reservoir the same flow as the output of pump 90. A check valve 160 prevents reverse flow through valve 154 when valve 144 is actuated.

Although we have specifically described and illustrated only two embodiments of our invention, with the variations in design and application also described, it will be understood by persons skilled in the art that various modifications may be made to suit requirements, and that other changes, substitutions, additions and omissions may be made in the construction, arrangement and manner of operation of the parts without necessarily departing from the scope of the invention as defined in the following claims:

We claim:

1. In a hydrostatic power transmission system for vehicles having first and second longitudinally spaced selectively drivable wheel means and first and second hydraulic motor means for driving said wheel means, a fluid drive means which includes a closed loop drive circuit coordinated with an open loop drive circuit, said drive circuits including first and second drive pump means, and control means for driving said first and second hydraulic motor means by said closed loop drive circuit and alternatively for driving said first hydraulic motor means by combining said closed and open loop drive circuits.

2. A hydrostatic power transmission system as claimed in claim 1 wherein said first pump means includes a variable displacement pump in said closed loop circuit and said second pump means includes a fixed displacement pump in said open loop circuit.

3. A hydrostatic power transmission system as claimed in claim 2 wherein said control means includes valve means for directing the discharge of said first pump means to both said first and second hydraulic motor means while directing the discharge of said second pump means to a reservoir, and for directing the discharge of said first pump means to said first hydraulic motor means while combining the discharge of said second pump means with the discharge of said first pump means to said first motor means and interrupting the discharge from said first pump means to said second motor means.

4. A hydrostatic power transmission system as claimed in claim 2 wherein said variable displacement pump is operator controlled for both forward and reverse drive to selectively operate said first and second motor means in forward and reverse drive in said closed loop circuit, and is operable with said fixed displacement pump in combination with said open loop circuit to operate said first motor means in forward and reverse drive.

5. A hydrostatic power transmission system as claimed in claim 4 wherein said fixed displacement pump operates in one direction only, and said control means includes means for directing the discharge of said fixed displacement pump to the discharge circuit of said variable displacement pump while operating said first motor means in forward or reverse drive.

6. A hydrostatic power transmission system as claimed in claim 5 wherein said latter included means comprises valve means for directing the discharge of said fixed displacement pump to the discharge circuit of said variable displacement pump, and other valve means for directing a fluid volume return flow to reservoir in said open loop circuit substantially equal to the discharge fluid volume of said fixed displacement pump.

7. A hydrostatic power transmission system as claimed in claim 2 wherein said variable displacement pump is reversible for driving said first and second motor means in forward or reverse, and operator control means for controlling the speed, displacement and direction of said pump means whereby rapid vehicle braking may be effected by a reversal of torque at the first and second motor means.

8. A hydrostatic power transmission system as claimed in claim 1 wherein said control means separates the discharge of said first and second pump means while driving in said closed loop circuit and combines the discharge of said first and second pump means while driving in said open loop circuit.

9. A hydrostatic power transmission system as claimed in claim 8 plus means controlling the volume of return fluid flow in said open loop circuit to be substantially equal to the volume of discharge of said second pump means while driving said first motor means by said open loop circuit.

10. A hydrostatic power transmission system as claimed in claim 9 wherein said latter control means includes motor means driven by a shaft common to said second pump means and having a flow capacity substantially equal to said second pump means.

11. A hydrostatic power transmission system as claimed in claim 1 wherein said closed loop drive circuit is operable both in forward and reverse drive for driving said first and second motor means, and said closed and open loop drive circuits when combined are operable both in forward and reverse drive for driving said first motor means in forward and reverse.

12. A hydrostatic power transmission system as claimed in claim 1 wherein said control means includes first and second coordinated operator control valve means, said first valve means being adapted to select operation of said closed loop drive circuit to drive said first and second motor means by said first pump means and actuatable with said second valve means to combine the outputs of said first and second pump means for driving said first motor means by said combined open and closed loop drive circuits.

13. A hydrostatic power transmission system as claimed in claim 12 wherein said first pump means includes a variable displacement pump in said closed loop circuit and said second pump means includes a fixed displacement pump in said open loop circuit.

14. A hydrostatic power transmission system as claimed in claim 13 wherein said variable displacement pump is reversible for driving said first and second motor means selectively in forward and reverse in said closed loop circuit and said fixed displacement pump is one-direction, and third valve means responsive to pressure in said closed loop circuit for directing the flow in said open loop circuit to drive said first motor means in forward or reverse in combination with said closed loop circuit.

15. A hydrostatic power transmission system as claimed in claim 1 wherein said control means includes operator controlled valve means in said closed loop circuit for interrupting the flow of fluid to the second motor means and redirecting it to the first motor means to effect a shift from driving said first and second motor means to driving said first motor means, said valve means including transition control means to redirect to the low pressure side of the closed loop circuit the fluid flow to said second motor means to facilitate smooth operation during transition from driving said first and second motor means to driving said first motor means.

16. A hydrostatic power transmission system as claimed in claim 1 wherein said control means includes selector valve and flow divider means, said valve means being operative to direct the fluid flow from one side of said flow divider means either to said second motor means, or to the inlet of the first pump means, or to said first motor means.

17. A hydrostatic power transmission system as claimed in 16 wherein said control means includes also other valve means for directing the output of said second pump means to combine with the output of said first pump means when said fluid flow from said one side of said flow divider means is directed to said first motor means.

18. A hydrostatic power transmission system as claimed in claim 1 wherein when said closed loop circuit is driving said first and second wheel means in nondirigible movement the distribution of hydraulic fluid to the first and second motor means is such that the first and second wheel means traverse substantially the same circumferential distance in the same period of time irrespective of variations of surface traction as between surface engaging elements of any of said wheel-like means.

19. A hydrostatic power transmission system as claimed in claim 18 wherein fluid divider means distributes the hydraulic fluid to said first and second motor means to effect said traverse of such circumferential distance.

20. A hydrostatic power transmission system as claimed in claim 18 wherein said first wheel means is driven by said first and second pump means in the combination of said closed and open loop drive circuits at a rotational speed higher than when driven by said first pump means alone.

21. A hydrostatic power transmission system as claimed in claim 1 wherein an engine drives said first and second pump means and said control means includes operator means for controlling the displacement of said first pump means and for controlling engine speed, said operator means being adpated to control directly in combination the engine and first and second pump means for optimal operation under varying conditions of vehicle operation.

22. In a hydrostatic power transmission system for a vehicle having first and second pairs of selectively drivable wheels and first and second pairs of hydraulic motors for driving respective pairs of wheels, a fluid drive system for driving selectively one or both pairs of said wheels comprising a closed loop drive circuit coordinated with an open loop drive circuit, said closed loop drive circuit including engine driven variable displacement pump means, independent operator control means for controlling said engine and said pump means, means for distributing the drive fluid to said first and second pairs of motors when all said motors are driving said wheels and control means for interrupting the flow of fluid to one pair of said motors and redirecting it to the other pair of said motors to effect a shift from four to two-wheel drive without interrupting the flow of drive fluid to said other pair of motors, said open loop circuit including an engine driven fixed displacement pump the discharge of which is separate from the discharge of the variable displacement pump being recirculated to a reservoir during four-wheel drive, and control means coordinated with the last mentioned control means in said closed loop circuit to direct the discharge of said fixed displacement pump to combine with the discharge of the variable displacement pump in two-wheel drive.

23. A hydrostatic power transmission system as claimed in claim 22 wherein said fixed and variable displacement pumps are of substantially equal capacity whereby the wheel speed ratio in two-wheel drive in relation to four-wheel drive is substantially 4:1.

24. A hydrostatic power transmission system as claimed in claim 22 wherein means is provided in said open loop circuit in two-wheel drive to return to a reservoir substantially the same volume of fluid as is discharged by said fixed displacement pump in two-wheel drive.

25. A hydrostatic power transmission system as claimed in claim 22 wherein said control means in said closed loop circuit and in said open loop circuit includes valve means in each circuit operator controlled and coordinated to effect a relatively smooth transition from four-wheel drive to two-wheel drive and to combine said open and closed loop circuits.

26. A hydrostatic power transmission system as claimed in claim 22 wherein said variable displacement pump is reversible for reversing the direction of vehicle movement and for effecting dynamic braking, the control means of said fixed displacement pump including shuttle valve means responsive to the discharge pressure of said variable displacement pump for directing the discharge of said fixed displacement pump into said closed loop circuit in two-wheel drive irrespective of forward or reverse operation of said variable displacement pump.

27. A hydrostatic power transmission system as claimed in claim 22 wherein one of said pairs of wheels are dirigible wheels, and adjustable fluid divider means in circuit with the first fluid divider means and with a pair of said motors, said adjustable fluid divider means being responsive to steering angles of said dirigible wheels for dividing between said latter pair of motors as a function of steering angle that portion of hydraulic fluid directed to said adjustable fluid divider means by said first fluid divider means in both two and four-wheel drive.

28. A hydrostatic power transmission system as claimed in claim 22 wherein circuit unloading valve means is responsive to drive circuit pressure in two-wheel drive to unload the circuit in the event of an over-pressure condition at the discharge of the fixed displacement pump.

29. In a hydrostatic power transmission system for a vehicle having first and second pairs of selectively drivable wheels and first and second pairs of hydraulic motors for driving respective pairs of wheels, a fluid drive system for driving selectively one or both pairs of said wheels comprising a closed loop drive circuit coordinated with an open loop drive circuit, said closed loop drive circuit including engine driven variable displacement pump means, independent operator control means for controlling said engine and said pump means, means for distributing the drive fluid to said first and second pairs of motors when all said motors are driving said wheels and control means for interrupting the flow of fluid to one pair of said motors and redirecting it to the other pair of said motors to effect a shift from four to two-wheel drive without interrupting the flow of fluid to said other pair of motors, said open loop circuit including an engine driven fixed displacement pump the discharge of which is separate from the discharge of the variable displacement pump being recirculated to a reservoir during four-wheel drive, control means coordinated with the last mentioned control means in said closed loop circuit to direct the discharge of said fixed displacement pump to combine with the discharge of the variable displacement pump in two-wheel drive, means in said open loop circuit in two-wheel drive for returning to a reservoir a volume of fluid substantially equivalent to that which is discharged by said fixed displacement pump in two-wheel drive, said control means in said closed loop circuit and in said open loop circuit including valve means in each circuit operator controlled and coordinated to effect a relatively smooth transition from four-wheel drive to two-wheel drive and to combine said open and closed loop circuits, said variable displacment pump being reversible for reversing the direction of vehicle movement and for effecting dynamic braking, the control means of said fixed displacement pump also including a shuttle valve means responsive to the discharge pressure of said variable displacement pump for directing the discharge of said fixed displacement pump into said closed loop circuit in two-wheel drive irrespective of forward or reverse operation of said variable displacement pump.

* * * * *